April 7, 1970 K. J. BRZONKALA ET AL 3,504,603
AUTOMATIC EXPOSURE CONTROL SYSTEM
Filed Aug. 24, 1967 2 Sheets-Sheet 1

INVENTORS,
KENNETH J. BRZONKALA
WILLIAM L. DUDLEY.
BY
ATTORNEYS.

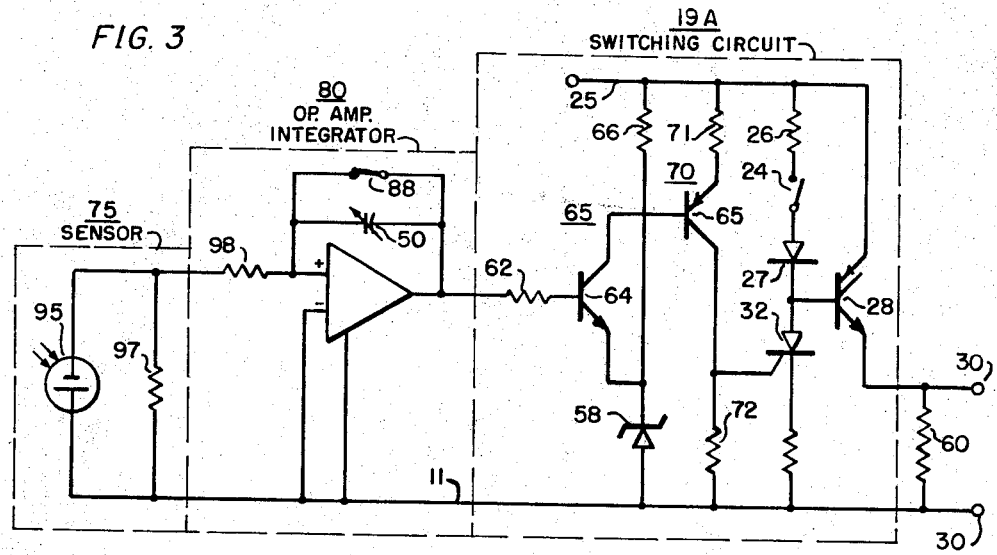
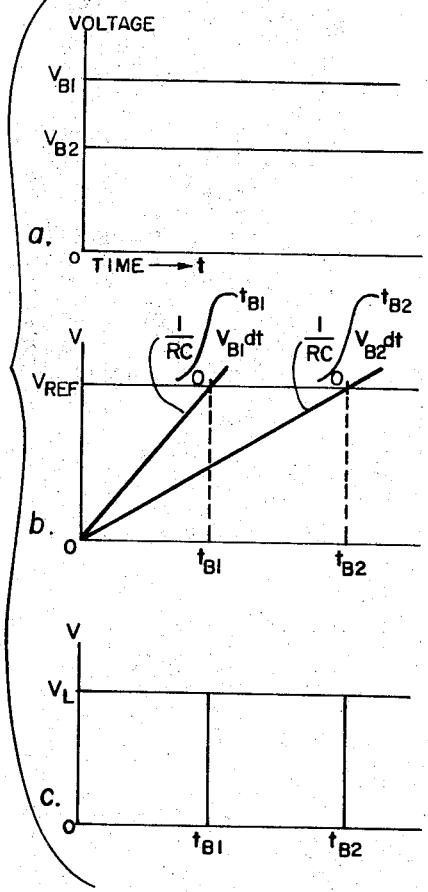
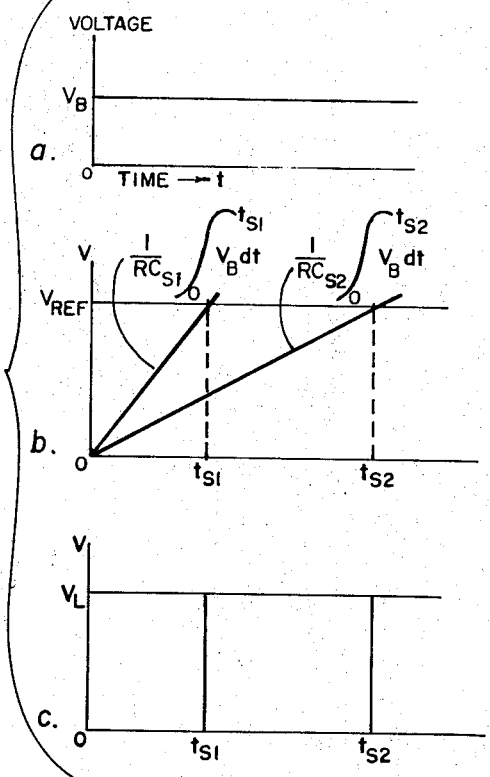

United States Patent Office 3,504,603
Patented Apr. 7, 1970

3,504,603
AUTOMATIC EXPOSURE CONTROL SYSTEM
Kenneth J. Brzonkala, Elberon, and William L. Dudley, Shrewsbury, N.J., assignors to the United States of America as represented by the Secretary of the Army
Filed Aug. 24, 1967, Ser. No. 663,178
Int. Cl. G03b 7/08; H01j 39/12
U.S. Cl. 95—10                                   6 Claims

ABSTRACT OF THE DISCLOSURE

An automatic exposure control system for controlling the shutter speed of a camera wherein information in the form of a voltage directly proportional to the illuminance of a scene is integrated linearly by an operational amplifier integrator and combined electrically with information representative of film speed to actuate an electronic switching circuit adapted to control the period of actuation of a camera shutter control mechanism.

---

The invention described herein may be manufactured, used, and licensed by or for the Government for governmental purposes without the payment to us of any royalty thereon.

BACKGROUND OF THE INVENTION

In general purpose photographic systems the requirements for accuracy of exposure control are not rigorous. For example, a one-stop accuracy in aperture or shutter speed control generally is sufficient for satisfactory film exposure. However, in many aerial photography applications, the increasing requirement of rapid access to photographic information has led to interpretation of the developed transparency prior to printing. This places more stringent requirements on the total reproduction characteristics of transparencies since tonal fidelity must already be present in the exposed film for maximum information transfer. To enhance further near-real time viewing of photographic information, a uniform, high-speed, in-flight processing technique also is desirable. The need for highly accurate automatic exposure control exists for rapid access photographic interpretation. With such accurate control, a roll of film can be exposed uniformly throughout a wide range of scene luminance and the uniform exposure, coupled with uniform processing, can yield the tonal fidelity required in the transparency for rapid access photographic intrepretation.

During the photographic process, a film integrates linearly the brightness of a scene. In automatic exposure control systems, therefore, it is desirable to integrate the luminance of the scene linearly in order to perform in the same manner as the film.

In the conventional shutter speed control system, a signal from a calibrated sensor is used to compute and set the optimum exposure for the scene luminance before film exposure is started. In one system of the prior art, a resistance-capacitance integrator integrates the sensor signal and a shutter solenoid is released. The conventional RC integrator simply integrates up to the maximum input signal and is linear only for a very short time at the start of integration.

In the system of the invention, on the other hand, the use of an operational amplifier integrator permits linear integration up to the maximum output of the sensor amplifier. The operational amplifier integrator imposes fewer restrictions on the dynamic range of shutter speed control than does the RC integrator and permits much more suitable control over a wide range of camera shutter speed.

Other automatic exposure systems normally sense the luminance of the scene and mechanically preset the aperture or time the exposure before exposing. The inertia of such systems is such that a drastic change in scene luminance during exposure will cause overexposure or underexposure of the film.

The system according to the invention differs from prior art systems in that the shutter is controlled instantaneously and at all times during exposure so that sudden changes in scene luminance during exposure does not result in overexposure or underexposure of the film. This is particularly apt to occur in applications such as aerial photography where changes in terrain and lighting often are sudden and drastic and where the luminance may be quite low, requiring long exposure times.

SUMMARY OF THE INVENTION

In accordance with the invention, a switch is turned on at the time of opening of the camera shutter which turns on an output gating device to provide a shutter control pulse for the camera shutter operating mechanism (for example, a shutter solenoid). The gating device may be turned on by applying a positive voltage to the gating device, whereupon the latter conducts and a shutter control pulse rises to the level of the applied voltage. Once the gating device is turned on, it remains on until turned off by a negative gating pulse. During the period that the gating device is on, a control pulse is applied to the shutter control solenoid to hold the shutter open so that the film may be exposed.

In the first embodiment of the invention, the light from the scene to be photographed is incident upon a first photodiode and causes a first voltage to be generated, the level of which depends upon the light intensity of the scene. This voltage is applied to an operational amplifier integrator which generates a ramp voltage having a slope proportional to the light intensity of the scene. The light from the scene also falls upon a second photodiode included in a transistor circuit incorporating a variable resistor. As the light strikes the second photodiode, the transistor is driven to saturation and a second voltage is derived from the transistor circuit the level of which is a function of film speed, inasmuch as the resistance in the transistor circuit is set to a value dependent upon the speed of the film inserted in the camera. This second voltage is amplified by an operational amplifier. The voltages from the operational amplifier and operational amplifier integrator are combined in an adder circuit and applied to a switching circuit. The switching circuit includes a control transistor supplied by the sum of the amplified voltages; a Zener diode is included in the control transistor circuit. When the combined voltage at the output of the adder circuit exceeds a predetermined threshold, that is, the bias provided by the Zener reference diode, the control transistor conducts and current flows to the gate of a silicon controlled rectifier, turning on the latter. When the silicon controlled rectifier conducts, negative gate current is drawn from the gating device and the gating device is turned off. The shutter control pulse thus is terminated and the camera shutter closes, thereby ending the exposure of the film.

In a second embodiment of the invention, light from a scene to be photographed impinges upon a sensor such as a silicon photovoltaic cell and the voltage is generated thereby which is directly proportional to the luminance of the scene. As in the first embodiment, a momentary closure of a start switch supplies a current pulse input into the gate of a gating device and initiates a shutter control pulse.

An output voltage from a sensor is supplied to an operational amplifier integrator. The slope of the ramp voltage generated by this integrator is dependent upon luminance alone when film speed rating is held constant. A change in film speed rating of the film used in the camera at the time of exposure also must change the slope of the ramp since, for a constant luminance, different film speeds require different exposure times. In contrast with the operational amplifier integrator of the first embodiment, the rate of integration is adjustable. The slope of the ramp is adjustable by means of a calibrated variable capacitor in the operational amplifier integrator set to a different value for each type of film used. The change in slope of the ramp generated by the linear operational amplifier integrator necessary to account for changes in film speed rating can be accomplished by manual setting of a capacitor which can be calibrated directly in terms of film speed.

The operational amplifier integrator is a linear integrator, just as the sensor for the input light signal is linear with scene luminance. These relationships allow for proper automatic exposure control since shutter speed is a linear function of scene luminance.

At the time of closing of the aforementioned switch, the operational amplifier integrator commences to integrate the voltage generated by the photosensor. In contrast to the first embodiment, luminance and film speed information can be introduced into the automatic exposure control system with but one operational amplifier, since the integrator itself has built-in means for representing film speed.

When the magnitude of the signal from the operational amplifier integrator has attained a predetermined level equal to the reference voltage of a Zener diode placed in circuit with a control transistor, base current starts to flow into this transistor; as the control transistor is turned on, a pulse is sent into the gate of a silicon controlled rectifier, turning it on. This, in turn, causes a negative current pulse to be drawn from a gating device and the latter is turned off, thus terminating the shutter control pulse and ending the exposure time.

BRIEF DESCRIPTION OF THE DRAWINGS

FIG. 3 is a schematic diagram illustrating a second embodiment of the invention; and FIGS. 4 and 5 are curves illustrating principles of operation of the embodiment shown in FIG. 3.

DESCRIPTION OF THE PREFERRED EMBODIMENTS

Figure 1:
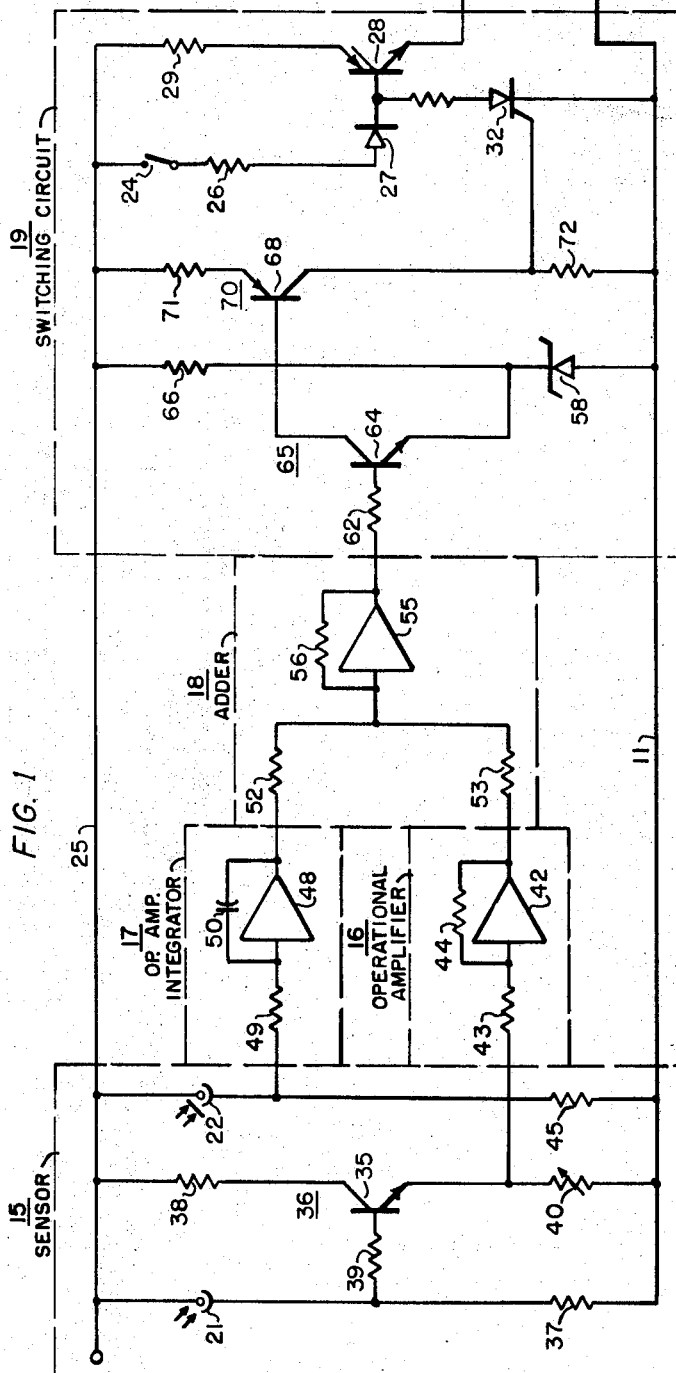
FIG. 1 is a schematic diagram illustrating a first embodiment of an automatic exposure control system according to the invention.

Referring now to FIG. 1, the automatic exposure control system includes a sensor 15, an operational amplifier 16, an operational amplifier integrator 17, an adder circuit 18 and a switching circuit 19. When a picture is to be taken, a switch 24 immediately is closed, either mechanically or electronically. Upon closure of switch 24, a positive potential from a bus 25 is supplied by way of resistor 26 and diode 27 to the base of a gating device 28, otherwise referred to as a gate turn-off switch. This device may, for example, be an npnp solid state device in which one of the zones acts as a gate to cause conduction in the presence of a gating pulse. With the base of the gating device forwardly biased, this device is turned on upon closure of the aforesaid switch, and the voltage at output terminals 30 rises instantaneously to a level determined by the resistance of the resistor 26. Once the gating device 28 is turned on, it remains on until subsequently turned off by a negative-going pulse. Initially, a silicon controlled rectifier 32 in the base circuit of the gating device 28 is non-conducting.

Resistor 29 prevents too rapid transient buildup of voltage at the cathode of gating device 28, particularly with a reactive load 60. The diode 27 functions to prevent premature closure of the shutter mechanism owing to a negative gate current which may otherwise flow if resistor 29 should become shorted and the cathode voltage of gating device 28 should thereupon exceed the voltage at bus 25.

The sensor circuit 15 of FIG. 1 includes two photodiodes 21 and 22 which receive light from the scene being photographed. The sensor 21 is biased by resistors 37 and 39. In the quiescent condition photodiode 21 essentialy is a high impedance device and the base of control transistor 35 is substantially at the potential of negative bus 11, which may be at ground potential. When light from the scene being photographed impinges upon photodiode 21, the latter becomes conducting and the base potential at transistor 35 rises to substantially the potential of the positive bus 25. Transistor 35, forming part of a conventional common emitter stage 36 biased by resistors 37, 38 and 39, is driven into conduction upon excitation of photodiode 21 and a voltage $V_1$ is developed across the adjustable resistor 40 in the emitter circuit. The magnitude of this voltage $V_1$ can be varied by varying the resistance of resistor 40 in accordance with the different film speeds.

Since the emitter-collector drop across the transistor 35 in saturation and the voltage drop across collector resistor 38 are fixed, the only variable resistor in the transistor circuit is the adjustable resistor 40. The voltage $V_1$ across this film speed resistor 40 then is independent of scene luminance.

The voltage $V_1$, which is a function only of film speed, is amplified and inverted by an operational amplifier 16 which includes an amplifier device 42, input resistor 43 and fed-back resistor 44. The amplified voltage from operational amplifier 16 will be referred to as $V_{1a}$.

Light from the scene falling on the photodiode 22 causes current to flow therethrough and through resistor 45. A voltage $V_2$ is developed across resistor 45 which is directly proportional to the brightness of the scene. This voltage $V_2$ is integrated and inverted through an operational amplifier integrator 17 which comprises amplifier device 48, an input resistor 49 and a capacitor 50 in the feed-back circuit thereof. Such integrators are well known in the art and a typical example is shown on page 170 of an article "Operational Amplifiers" by J. Oosterling and S. Sijestra in Electronics Applications, vol. 26, No. 4, 1967. A voltage ramp is derived from operational amplifier integrator 17, the slope of which is a function of the scene luminance. The brighter the scene, the steeper will be the slope of the ramp. The output voltage from operational amplifier integrator 17 will be referred to as $V_{2a}$.

The voltages at the outputs of the operational amplifying devices 16 and 17 are combined in an adder circuit 18 which includes balancing resistors 52 and 53 and an amplifier 55 with feed-back resistor 56. The adder 18, which includes an operational amplifier 55 with high gain, may have a gain either less than or greater than unity. The resistors 52 and 53 serve as calibration resistors which are preadjusted so that the relative levels of the signal voltages $V_{1a}$ and $V_{2a}$, after passage through the amplifier 55, are the same as the relative levels of voltages $V_1$ and $V_2$; in other words, the relative voltage level is not altered by the gain characteristics of the devices 16 and 17. The algebraic sum of the voltages applied to the adder 18 will be a positive ramp superimposed upon a positive constant level. The magnitude of the constant portion, together with the slope of the ramp, thus determines the exposure time, as will be more apparent after referring to FIG. 2.

Figure 2:
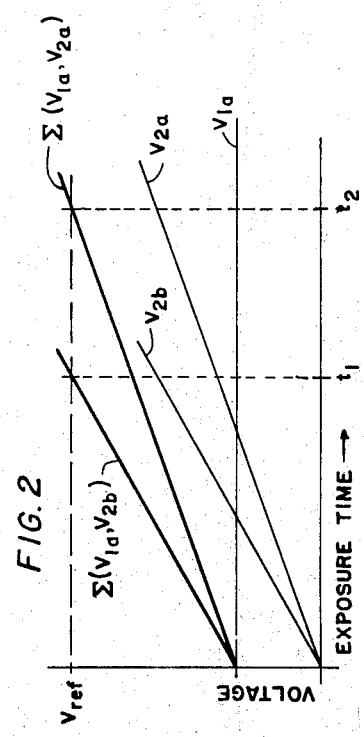
FIG. 2 are curves illustrating certain operating principles of the embodiment of FIG. 1.

Referring now to FIG. 2, the relationship between exposure time and various voltage levels is shown, for a fixed film speed and different luminance levels. A voltage $V_1$ will be derived across resistor 40 which, after amplification by operational amplifier 16, will be at some fixed level $V_{1a}$, as indicated in FIG. 2. This level $V_{1a}$, depending as it does upon the setting of the film speed resistor 40, is a function of camera film speed. A ramp voltage $V_2$ will be generated across resistor 45 which, after amplification and integration in operational amplifier integrator 17, will have a slope dependent upon the luminance. For a relatively low luminance, a ramp $V_{2a}$ will exist at the output of operational amplifier integrator 17. For a relatively high luminance, a ramp $V_{2b}$ of steeper slope will be derived from the operational amplifier integrator 17. The voltage $V_{1a}$ and either $V_{2a}$ or $V_{2b}$, as the case may be, are combined in the adder 18 so that the ramps $V_{2a}$ and $V_{2b}$ are superimposed upon the fixed voltage level $V_{1a}$, as shown by the respective adder output voltage curves labeled $\Sigma(V_{1a}, V_{2a})$ and $\Sigma(V_{1a}, V_{2b})$. These two adder output voltages intersect the dotted line representing the reference voltage $V_{ref}$ of the Zener diode 58 in the switching circuit 19 at different times. In the case of the lower brightness level, the intersection is at time $t_2$, as compared with time $t_1$ for the higher brightness level. As will now be explained, the exposure time, or duration of the shutter control pulse across load 60 decreases with increasing scene brightness.

This sum voltage from adder 18 yields a current through resistor 62 to drive the base of normally cut-off transistor 64 of common emitter transistor stage 65 including resistor 66 and Zener reference diode 58. Transistor 64 thus is turned on when the bias provided by the Zener reference diode 58 is overcome. Since the diode 58 influences the threshold of conduction of transistor 64, it is a factor in determining exposure time. When transistor 64 becomes conducting, base current is drawn from transistor 68 in the common collector transistor circuit 70 including emitter resistor 71, and collector resistor 72; transistor 68 is turned on and current is allowed to flow to the gate of silicon controlled rectifier 32, turning on the latter device. The silicon controlled rectifier 32 now conducts and draw a negative gate current from the gating device 28. The gating device 28 now is turned off. Since current cannot flow through the gating device 28, silicon controlled rectifier 32 is commutated off through lack of a holding current. It should be noted that switch 24, having been closed only momentarily at the start, is now open.

When the gating device 28 is turned off as a result of the negative-going pulse applied to the gate, the shutter control pulse at terminals 30 is terminated. Consequently, the shutter mechanism is deenergized and the shutter is closed, thereby terminating exposure of the film in the camera.

Referring to FIG. 3, a second embodiment of the invention is shown which requires only one photosensor and one operational amplifier device. The circuit of FIG. 3 consists basically of a sensor 75, an integrating operational amplifier 80 and a switching circuit 19A. The switching circuit 19A may be identical with the switching circuit 19 shown in FIG. 1 and the same reference numerals are used for like circuit elements.

To initiate exposure of film, that is, at time $t_0$, switch 24 is closed momentarily and switch 88 in the operational amplifier integrator 80 is opened. When switch 24 is closed, a positive current pulse is supplied to the gate of gating device 28 to turn it on and initiate an output pulse across a load 60. The load, as in the case of the circuit of FIG. 1, can be a camera shutter solenoid. When switch 88, which can be ganged to switch 24, is opened, a short circuit is removed from adjustable capacitor 50 of operational amplifier integrator 80 and integrator 80 begins to integrate the signal from the sensor circuit 75 which includes sensor device 95 and biasing resistor 97. The sensor 95 may be a silicon photovoltaic cell, which has a linear luminance versus output voltage signal response characteristic under load. Such a sensor also has a sufficiently fast response time and the proper spectral response to light.

The level of the sensed signal is converted to a timing function, with time being inversely proportional to the signal voltage level, the conversion of the sensed signal is illustrated in FIG. 4. In FIG. 4a, the sensing signals $V_{B1}$ and $V_{B2}$ are indicated, corresponding to two brightness levels $B_1$ and $B_2$, respectively. When applied to the operational amplifier integrator 80, the signal $V_{B1}$ or $V_{B2}$, as the case may be, is integrated to produce either of the two ramp functions indicated in FIG. 4b. As the ramp functions reach a reference voltage level $V_{ref}$, that is, the reference voltage set by the Zener diode 58, at times $T_{B1}$ and $T_{B2}$, respectively, they trigger the switching circuitry 19A, in a manner already described in connection with the switching circuit 19 of FIG. 1, to turn off the shutter control pulse at output terminals 30 at the times $T_{B1}$ and $T_{B2}$ for respective levels $V_{B1}$ and $V_{B2}$. The lengths of the control pulse $V_L$ across terminals 30 are shown in FIG. 4c. With the circuit of FIG. 3, the slope of the ramp is dependent upon luminance level alone, provided film speed is held fixed. A change in speed rating of the film in the camera must also change the slope of the ramp from operational amplifier integrator 80, since, for a given luminance, different film speeds require different exposure time. This change is accomplished manually by setting the capacitor 50 in the operational amplifier integrator 80, at a constant luminance B, according to the relationship:

$$\frac{C_{S1}}{C_{S2}} = \frac{S_2}{S_1}\bigg|B = \text{constant}$$

where $S_1$ and $S_2$ are the speed ratings of the different films and $C_{s1}$ and $C_{s2}$ are the capacitor settings for film speeds $S_1$ and $S_2$, respectively.

For a given scene brightness B, the signal voltage $V_B$ will be as shown in FIG. 5a. Two ramp functions are shown in FIG. 5b representing the different film speeds $S_1$ and $S_2$. The ramps will trigger the switching circuit at the times $t_{s1}$ and $t_{s2}$ when they reach the reference voltage to turn off the gating device 28 and terminate the shutter control pulse. The lengths of the shutter control pulse $V_L$ for the two illustrated film speeds is shown in FIG. 5c. FIG. 4 shows the case of constant film speed rating and variable luminance B with $B_1$ greater than $B_2$, while FIG. 5 is for the case of constant luminance B and variable film speed rating S with $S_1$ being greater than $S_2$. The superposition of these two functions yields the desired linear switching capability for the shutter control signal.

As soon as the voltage from operational amplifier integrator 80 attains the reference level $V_{ref}$ of Zener diode 58, control transistor 64 is driven into conduction, transistor 68 and silicon controlled rectifier 32 are turned on, and the gating device 28 is turned off, all in the manner described previously. Since the slope of the ramp increases with the light intensity and with film speed, the threshold at which the gating device cuts off is reached more rapidly as the light intensity and film speed increase. Thus the shutter control pulse is cut off more quickly at higher light level and at faster film speeds.

What is claimed is:

1. An automatic exposure control circuit for controlling actuation of means for determining exposure of photographic film to a given scene, comprising first and second photosensitive devices for deriving respective first and second voltages the levels of which depend upon the light intensity of said scene, first circuit means including an operational amplifier integrator responsive to said first voltage for generating a linear ramp voltage having a slope proportional to the light intensity of said scene, second circuit means including a linear operational amplifier responsive to said second voltage and including a variable resistor set to a value dependent upon the speed of said film for generating a constant voltage the level of which represents said film speed, combining means for electronically adding said ramp voltage and said constant voltage, and switching means receptive of the combined output of said combining means and responsive to attainment of a threshold voltage level for actuating an electronic switch controlling the period of actuation of said exposure determining means.

2. An automatic exposure control circuit according to claim 1 wherein said second circuit means includes an electron device driven into conduction upon excitation of said first photosensitive device.

3. An automatic exposure control circuit according to claim 1 wherein said switching means comprises a first control electron device supplied by the combined voltage from said combining means, a Zener reference diode for providing a predetermined threshold bias for said first control electron device, said control electron device conducting when said combined voltage exceeds said threshold, a second control electron device rendered conducting when said first control electron device conducts and a gating device turned off in response to conduction of said second control electron device.

4. An automatic exposure control circuit for controlling actuation of means for determining exposure of photographic film to a given scene, comprising, a photosensitive device for deriving a voltage the level of which depends upon light intensity of said scene, circuit means including an operational amplifier integrator for integrating said voltage linearly over the entire range of brightness of said scene, said means for integrating providing a ramp voltage of slope proportional to said brightness, said integrator including an adjustable impedance means for modifying the slope of said ramp voltage in accordance with film speed, switching means receptive of the modified ramp voltage and including a reference voltage device and a control electron device, said control electron device being actuated when said modified ramp voltage exceeds said reference voltage for operating an electronic switch controlling the period of actuation of said exposure determining means.

5. An automatic exposure control circuit according to claim 4 wherein said impedance means is a variable capacitor.

6. An automatic exposure control circuit according to claim 4 wherein said switching means comprises a first control electron device supplied by the combined voltage from said combining means, a Zener reference diode for providing a predetermined threshold bias for said first control electron device, said control electron device conducting when said combined voltage exceeds said thershold, a second control electron device rendered conducting when asid first control electron device conducts and a gating device turned off in response to conduction of said second control electron device.

References Cited
UNITED STATES PATENTS

| | | |
|---|---|---|
| 3,063,354 | 11/1962 | Matulik et al. |
| 3,106,646 | 10/1963 | Carter _____ 330—30 |
| 3,205,803 | 9/1965 | Burgarella et al. |
| 3,257,919 | 6/1966 | Sato et al. |
| 3,336,850 | 8/1967 | Otani et al. |
| 3,400,334 | 9/1968 | Ross et al. _____ 330—14 XR |

NORTON ANSHER, Primary Examiner

J. F. PETERS, JR., Assistant Examiner

U.S. Cl. X.R.

95—53; 250—208, 220; 317—127, 148.5; 330—30